(12) United States Patent
Mishra

(10) Patent No.: US 10,860,977 B1
(45) Date of Patent: Dec. 8, 2020

(54) PREDICTIVE PLACEMENT OF INVENTORY BASED UPON PULL SIGNALS

(71) Applicant: Amazon Technologies, Inc., Seattle, WA (US)

(72) Inventor: Pragyana K. Mishra, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 737 days.

(21) Appl. No.: 15/196,790

(22) Filed: Jun. 29, 2016

(51) Int. Cl.
*G06Q 10/08* (2012.01)
*G06Q 30/08* (2012.01)

(52) U.S. Cl.
CPC .......... *G06Q 10/087* (2013.01); *G06Q 30/08* (2013.01)

(58) Field of Classification Search
CPC ............................ G06Q 10/087; G06Q 30/08
See application file for complete search history.

(56) References Cited

U.S. PATENT DOCUMENTS

| 5,712,989 A * | 1/1998 | Johnson | G06Q 10/087 235/385 |
| 2002/0161674 A1* | 10/2002 | Scheer | G06Q 10/0631 705/28 |
| 2014/0201041 A1* | 7/2014 | Meyer | G06Q 10/087 705/28 |
| 2016/0294967 A1* | 10/2016 | Reveron | H04L 67/327 |

* cited by examiner

*Primary Examiner* — Florian M Zeender
*Assistant Examiner* — Joseph M Mutschler
(74) *Attorney, Agent, or Firm* — Thomas Horstemeyer, LLP

(57) ABSTRACT

Disclosed are various embodiments for shifting inventory within an inventory network. In a traditional push fulfillment model, items are delivered to customers after orders are placed by customers from a warehouse or fulfillment center through a traditional shipping carrier. Using a pull model as described herein, inventory is shifted throughout an inventory network based upon pull signals generated by sensor networks associated with customers that represent predictions for future orders by customers and the inventory is retrieved by the network node that issues the pull signal.

20 Claims, 9 Drawing Sheets

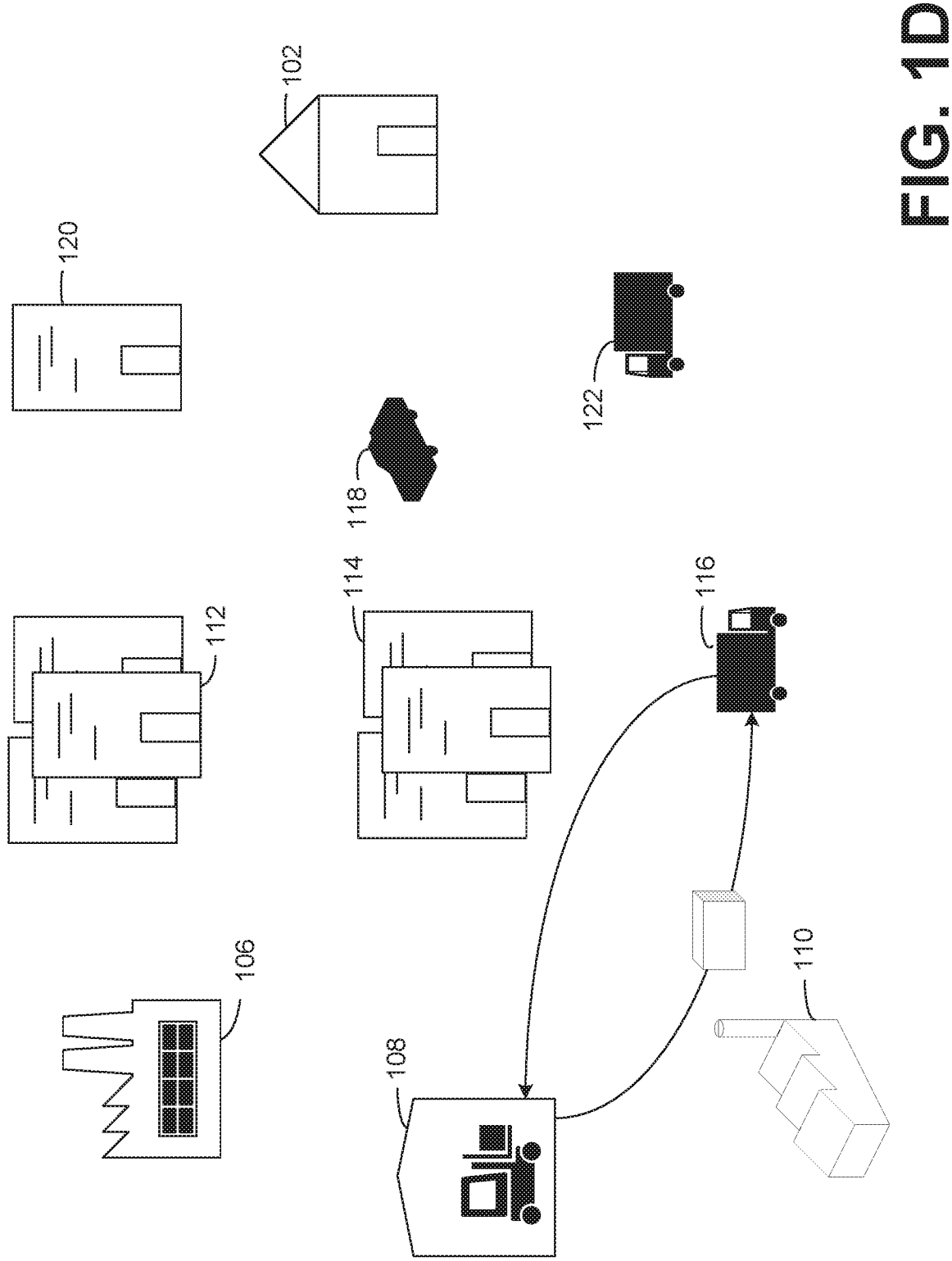

PREDICTIVE PLACEMENT OF INVENTORY BASED UPON PULL SIGNALS

BACKGROUND

Items within a network, such as a fulfillment or logistics network, have been traditionally delivered using a push model in which items are sent from an origin point, such as a manufacturer or warehouse, to a particular destination. Delivery of an item is generally initiated by the origin point, handed off to a carrier, which in turn might hand the item to one or more intermediate carriers or a last-mile carrier to deliver the item to its destination. The push model of delivering an item can be inefficient because the capacity of intermediate nodes within the network are not utilized until the item is sent from the origin point. These intermediate nodes may possess excess capacity that is not being utilized until called upon by the origin point of the item. Additionally, the push model may also require significant lead time or delivery time to get the item from the origin point to its final destination.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 1A-1F illustrate an inventory network according to embodiments of the disclosure.

DETAILED DESCRIPTION

The present application is directed to shifting items within a network, such as an inventory network, based upon signals obtained from a sensor network. The sensor network can include one or more sensors that are associated with a user or customer. The sensors can include a variety of internet-of-things devices that are embedded with sensors that detect conditions or behavior about a particular customer. For example, the sensor network can include a smart refrigerator that detects spoliation or consumption of foods and drinks that are stored within the refrigerator. The sensor network can also include environmental sensors, such as temperature sensors, humidity sensors, energy consumption sensors, pollution sensors, or other forms of environmental sensors that can monitor conditions within a home or other environment. The sensor network can include medical or healthcare sensors, such as blood sugar sensors, weight sensors on a scale, sensors that can identify when medication requires replenishment, heartrate monitors, or other healthcare-related sensors. As another example, the sensor network can include home automation or security sensors that can detect the state of people or other devices, such as lightbulbs, within a home or other type of environment.

The sensor network can also include sensors within a home, automobile, or other environment that detect fuel levels, battery charging levels, or other energy storage data, which can facilitate determining when replenishment or recharging is necessary. The sensor network can also include buttons or devices that a user can operate to request or purchase items from an electronic commerce site. In one example of such a device, a user can press a button within the home that is specifically configured to cause an order for a supply of laundry detergent to be purchased from an electronic commerce site and delivered to the user's home. The sensor network can also include computing devices, such as smartphones, computers, tablets, media streaming devices, smart televisions, or other devices.

An inventory network can receive signals from the sensor network and cause items to be proactively shifted throughout the inventory network so that items that a customer is likely to desire or order are disposed in close proximity to the customer's location or in a location from which the item can be quickly and efficiently delivered to the customer. For example, if a user watches a particular movie using a smart television, the smart television can generate pull signals for products or items that are related to the movie, such as branded apparel related to the movie, which can be shifted in the inventory network to carriers or locations that are in closer proximity to the customer's location, as the user is more likely to purchase such apparel than a user who has not watched the movie.

Figure 1A:
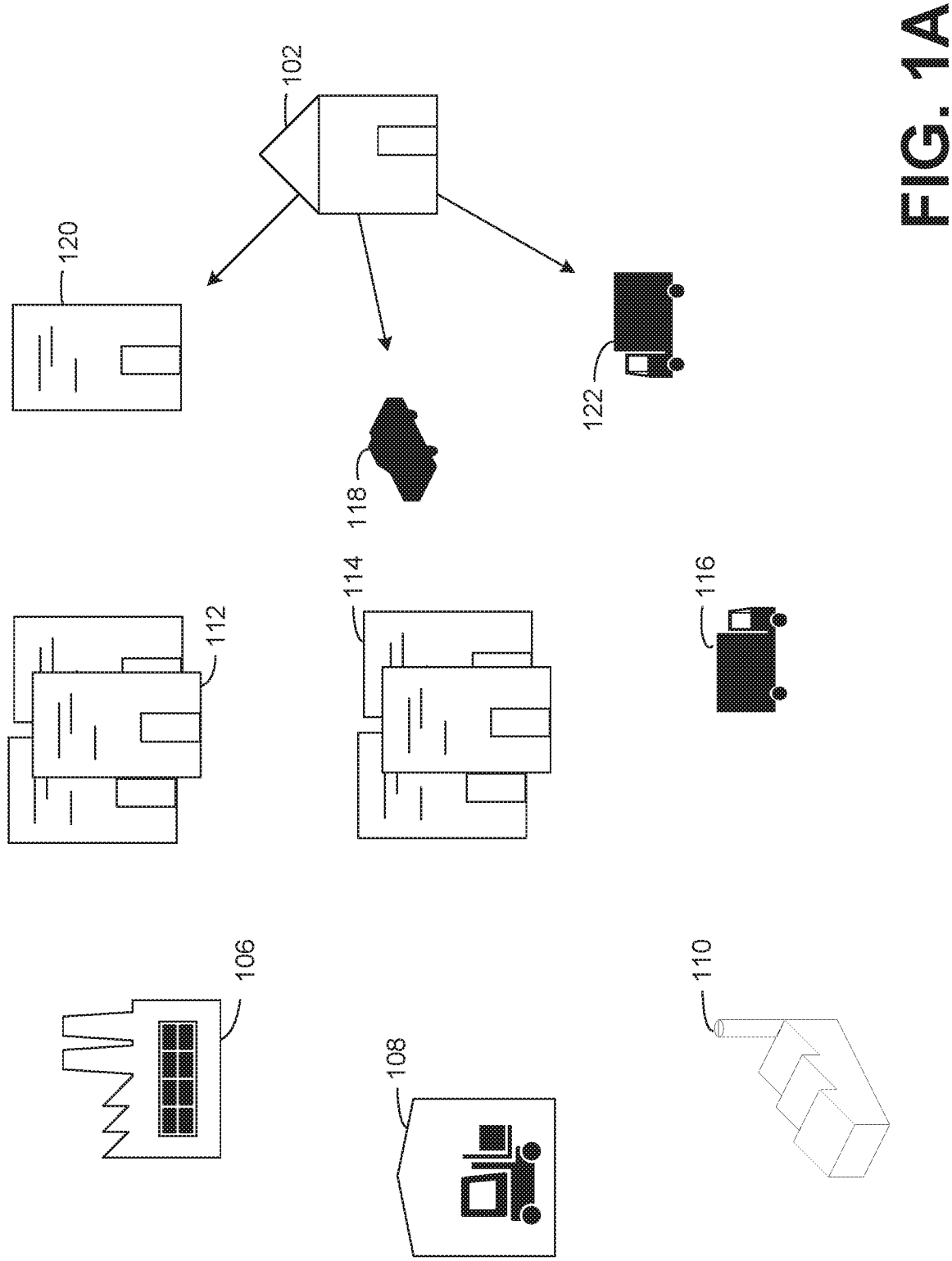

With reference to FIG. 1A, shown is a scenario according to an embodiment of the disclosure. The scenario includes a user's premises 100 and multiple inventory nodes 106-122 that are a part of an inventory network according to one example. The user's premises 100 is also associated with a sensor network 102, as the user's premises 100 contains one or more sensors, computing devices, or other devices that can generate pull signals that cause items to be shifted within the various inventory nodes 106-122 in an inventory network. The sensor network 102 can include voice assistant devices that allow a user to submit verbal commands, in response to which the voice assistant can take an action. For example, the voice assistant can allow the user to obtain information about the weather or other information from the internet, which is verbalized by a text-to-speech engine in the voice assistant. The voice assistant can also allow the user to purchase items from an electronic commerce site or indicate an interest in items. The voice assistant can also play music, movies, or television programs on behalf of the user. The voice assistant can also interact with other services, such as a thermostat within the home, a ticketing service from which a user can purchase tickets, hail taxis or car-sharing services, or perform other tasks. The voice assistant can also analyze user behavior and infer interests and product recommendations from the user's searches, media consumption history, utility usage history, or other data. The sensor network can also include various sensors within the home as noted above which can also be associated with a user account within a network site, such as in an electronic commerce site.

The inventory nodes 106-122 within the inventory network can be affiliated with the network site and represent a manufacturer of products, such as inventory nodes 106 and 110. An inventory node can also include a warehouse or distribution center, inventory node 108, from which products or items are shipped to customers or to other nodes within the inventory network. An inventory node can also include retail establishments, such as inventory nodes 112, 114, and 120, which can obtain items from a warehouse or manufacturer for sale or distribution to the public. Inventory nodes can also include intermediary carriers, or inventory nodes 116 and 122, that can transport items within the inventory network from or between the other inventory nodes and even to the user premises. Inventory nodes can also include last-mile carriers, such as inventory node 118, which can deliver items from one inventory node to a user premises. In some scenarios, an inventory node within the inventory network can include a taxi or ride-sharing provider that may have excess capacity to transport items between inventory nodes or to a user premises 100.

In one embodiment, the various inventory nodes 106-122 within an inventory network can operate independently. In other words, there might be no centralized broker or management system that determines where inventory of certain items should be held. The various inventory nodes 106-122 can obtain inventory for various items based upon inventory pull signals generated by the sensor network 102. In one example, based upon consumption of an item detected by the sensor network 102, the sensor network 102 can transmit inventory pull signals to inventory nodes that are within a threshold distance of the user's premises.

The inventory pull signal can indicate a user interest in a particular product or item based upon behavior or environmental conditions detected by the sensor network 102. The inventory pull signal can be sent over a network connection and received by a first level of inventory nodes that are closest to the user premises. In the scenario of FIG. 1A, the inventory pull signal can be sent from the sensor network 102 to inventory nodes 118, 120, and 122. The inventory pull signal can identify one or more products or items available for purchase via the network site in which the user has indicated an interest. In this sense, the inventory pull signal generated by the sensor network 102 can represent a prediction that a user will purchase a particular item. The inventory pull signal can also represent a product recommendation for the item.

The inventory nodes 118, 120, and 122 within the inventory network can determine whether the item identified by the inventory pull signal is present within inventory of the inventory node. For example, if the inventory node is a retail establishment, such as inventory node 120, an inventory management system or other systems at the inventory node 120 can determine whether the item is stocked by the inventory node 120. If the inventory nodes 118, 120, and 122 do not possess or stock the item, one or more of the inventory nodes 118, 120, and 122 can generate their own respective inventory pull signal that is sent to downstream inventory nodes.

Figure 1B:
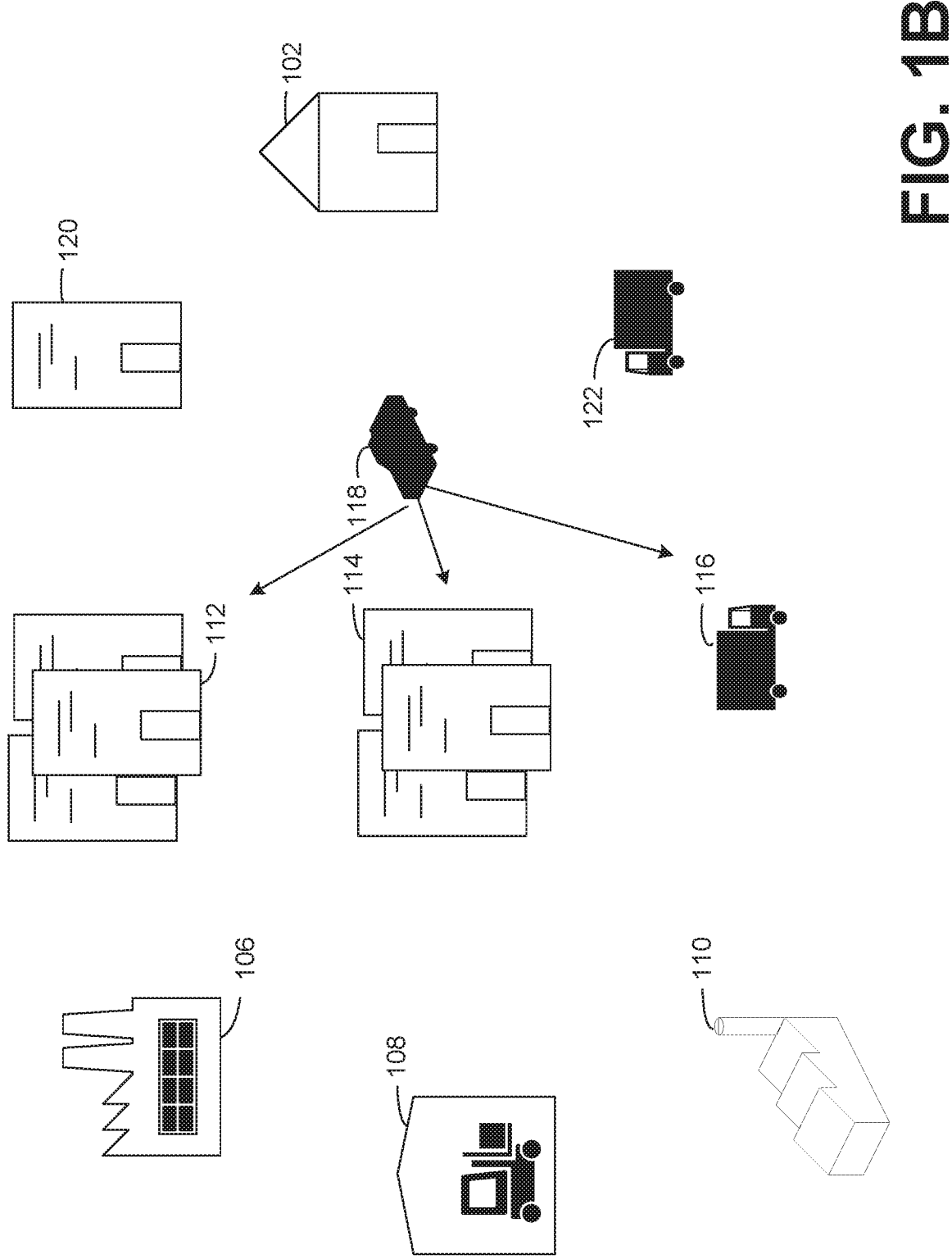

Accordingly, reference is made to FIG. 1B, which continues the example of FIG. 1A. In FIG. 1B, inventory node 118 has generated an inventory pull signal that is sent to downstream inventory nodes 112, 114, and 116. The inventory pull signal identifies the item that is in the inventory pull signal received from the sensor network 102. The inventory nodes 112, 114, and 116 are downstream relative to the sensor network 102 in the sense that they are further in distance from a location of the user premises than upstream inventory nodes 118, 120, and 122. The downstream nodes can also be located within a distance threshold of the inventory node 118 that is sending the inventory pull signal. The inventory pull signal can include a bid price and a bid quantity for the item that is sent to the downstream inventory nodes 112, 114, and 116, which represents an amount that the inventory node 118 is willing to pay for the item and a quantity requested by the inventory node 118.

In some scenarios, more than one inventory node from a given level, such as more than one of inventory nodes 118, 120, and 122, can transmit an inventory pull signal that identifies a bid quantity and bid price for the item. In this sense, inventory nodes can be in competition with one another to acquire an item that is in proximity to the user premises in expectation of a sale transaction to the user. In the depicted non-limiting example, only a single inventory node 118 has transmitted an inventory signal identifying the item to downstream inventory nodes 112, 114, and 116.

Figure 1C:
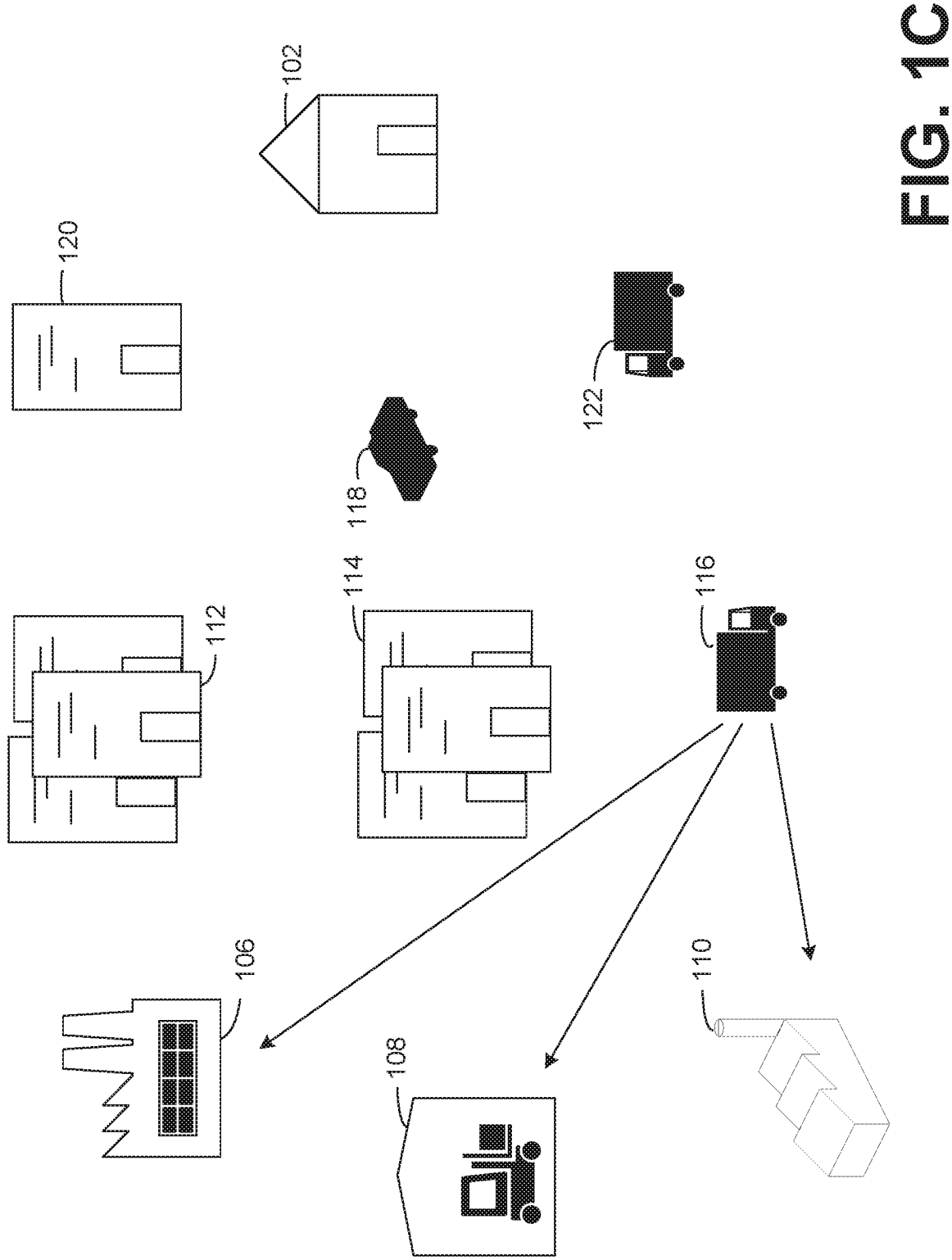

Reference is now made to FIG. 1C, which continues the example of FIG. 1B. In FIG. 1C, the inventory node 116 has generated and transmitted an inventory pull signal to inventory nodes 106, 108, and 110 that are further downstream in response to determining that it does not possess the item requested by inventory node 118. In some examples, the inventory node 116 can generate another inventory pull signal only after determining that the bid price meets a minimum acceptable threshold for the requested bid quantity requested by the inventory node 118. In one scenario, the inventory nodes can be governed by a rules engine that is based upon minimum profitability or profit margin metrics or by user intervention of a user in control of the inventory node. In this way, the inventory node 116 can only generate an inventory pull signal after it determines that a bid price and bid quantity meets a minimum threshold. Additionally, the inventory pull signal generated by the inventory node 116 can include a bid price and bid quantity that may vary from those provided in the inventory pull signal received from inventory node 118. For example, the inventory node 116 can generate a bid price and bid quantity that are lower than the bid price and bid quantity provided in the inventory pull signal from inventory node 118 based upon profitability rules.

Continuing the example of FIG. 1C, reference is now made to FIG. 1D. In FIG. 1D, in response to the inventory pull signals depicted in FIG. 1C, the inventory node 108 and inventory node 116 initiate transfer of the item identified in the inventory pull signal sent from the sensor network 102. The item is transferred to the inventory node 116 from which the inventory pull signal originated in FIG. 1C. Accordingly to embodiments of the disclosure, rather than the inventory node 108 pushing or shipping the item to the requesting inventory node 116, the inventory node 116 retrieves the item from the inventory node 108. In other words, a "pull" model is adopted.

Figure 1E:
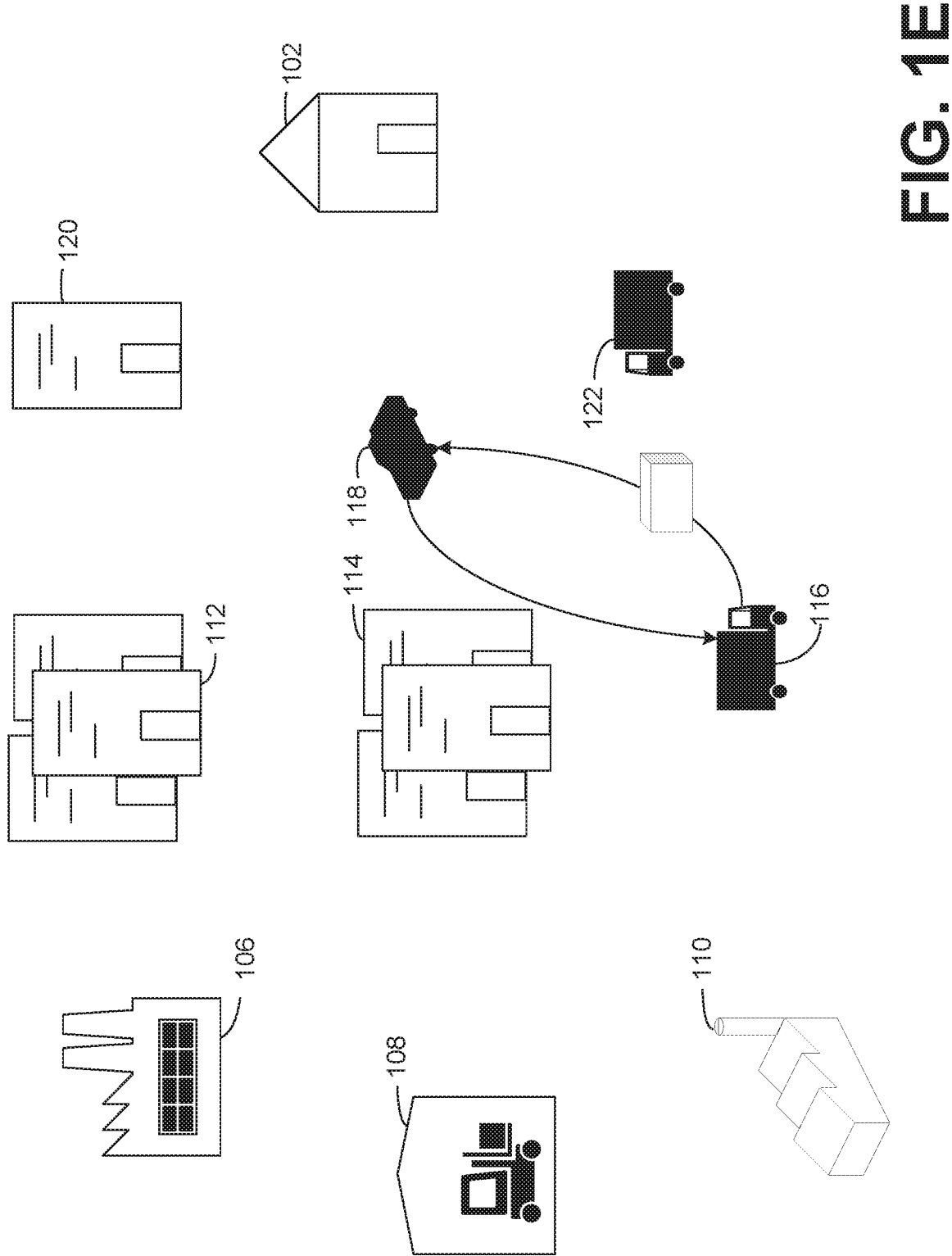

Continuing the example of FIG. 1D, reference is now made to FIG. 1E. In FIG. 1E, in response to the inventory pull signals depicted in FIG. 1B, the inventory node 116 initiates transfer of the item identified in the inventory pull signal sent from the sensor network 102. The item is retrieved by the inventory node 118 from which the inventory pull signal originated in FIG. 1B. In this way, items are transferred within the inventory network based upon opportunistic pull signals sent from the sensor network 102 or inventory nodes. As a result, inventory is shifted closer to where users may require delivery of an item by leveraging the competitive nature of inventory nodes that are competing against one another within the inventory network in acquiring inventory from other inventory nodes in anticipation of a customer order. Additionally, customers can obtain items that they order from a network site faster in such a competitive environment, as items are shifted based upon pull signals sent from the user's sensor network 102, which often includes one or more sensors at the user premises or delivery location.

Figure 1F:
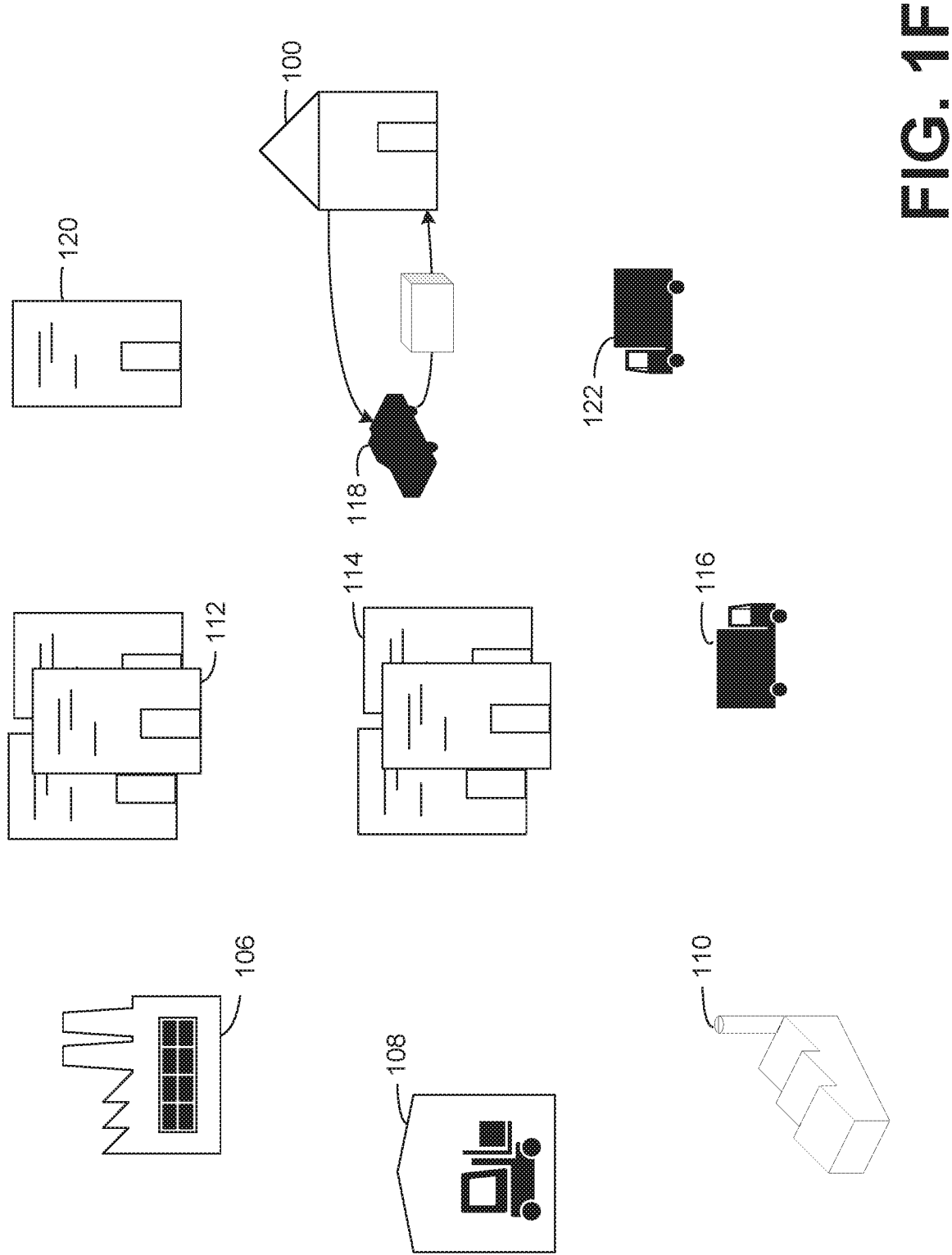

Continuing the example of FIG. 1E, reference is now made to FIG. 1F. In FIG. 1F, the item is retrieved from the inventory node 118 by the user in response to a customer order for the item from the network site or from the inventory node 118. In one embodiment, an order placed by the customer in a network site can be placed with the inventory node 118. In this way, the inventory node, or an entity associated therewith, can receive the proceeds of the order. Additionally, because inventory has been shifted closer to the user premises based upon opportunistic pull signals, the user can receive the item more quickly than in a push model in which an item is sent from a warehouse through a traditional push shipping model.

In another scenario, once the user associated with the user premises 100 determines that he or she wants the item, the user can cause a broadcast message to be sent to inventory nodes within a distance threshold of the user premises 100. The inventory node 118 can respond to the broadcast with an indication that it has the item at a particular price and during a certain time window. The user can retrieve the item from the inventory 118 during the time window.

Because this model can be employed in an environment in which there are many sensor networks 102 and many inventory nodes in a distributed fashion, items coalesce around areas of higher demand based upon a prediction that a user will purchase a particular item. The prediction is generated from opportunistic inventory pull signals generated by the sensor network 102 and can be leveraged to shift items through an inventory network in which independently operated inventory nodes are competing with one another to win a sale from the customer and/or supply an item to an inventory node that eventually sells the item to the customer. To this end, each inventory node within the inventory network can execute a broker that generates inventory pull signals and facilitates transactions with other inventory nodes or a network site on behalf of a user. The broker can assess rules defined within the inventory node to determine whether to initiate or process a transaction related to inventory within the inventory network on behalf of an inventory node.

Figure 2:
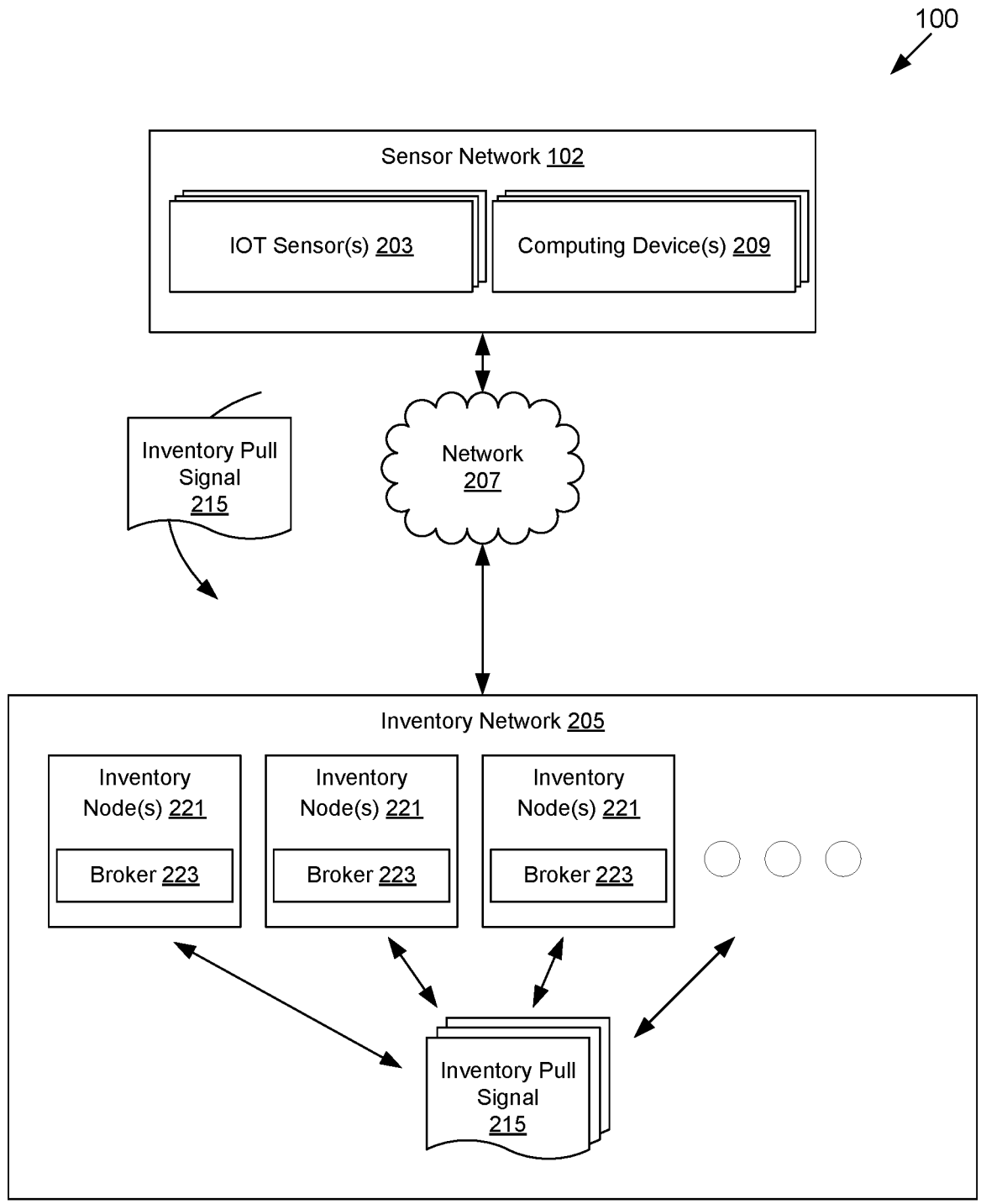
FIG. 2 is drawing illustrating an inventory network in communication with a sensor network according to embodiments of the disclosure.

Reference is now made to FIG. 2, which illustrates an alternative view of a sensor network 102 in communication with an inventory network 205 according to various embodiments of the disclosure. The sensor network 102 can include one or more sensors or other devices that are associated with a particular user account in a network site. The sensor network 102 can be in communication with an inventory network 205 over a network 207. The network 207 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The sensor network 102 can include one or more internet-of-things (IOT) sensor 203 and/or one or more computing devices 209. The sensor network 102 can be associated with a user's account within a network site, such as an e-commerce site, so that any behavior, consumption, or conditions detected by the sensor network 102 are linked with the user' account.

An IOT sensor 203 can include a sensor as described above that can monitor conditions, behavior, consumption, environmental conditions, or other aspects of a user's home, office, or transport vehicles. For example, an IOT sensor 203 can monitor weather conditions in or around a user's home. An IOT sensor 203 can also monitor electricity consumption at a user's home. An IOT sensor 203 can be a light bulb or light switch that provides information about whether a light is on or whether a light bulb is operating correctly.

As noted above, an IOT sensor 203 can also include a smart refrigerator that detects spoliation or consumption of foods and drinks that are stored within the refrigerator. An IOT sensor 203 can also include environmental sensors, such as humidity sensors, pollution sensors, fire or smoke detectors, carbon monoxide detectors or other forms of environmental sensors that can monitor conditions within a home or other environment. An IOT sensor 203 can also include medical or healthcare sensors, such as blood sugar sensors, weight sensors on a scale, sensors that can identify when medication requires replenishment, heartrate monitors, or other healthcare-related sensors. In this sense, an IOT sensor 203 can include any device that can be linked to a user's home or premises that can monitor any condition or behavior that is associated with the user.

A computing device 209 can represent a computer, smartphone, tablet, media streaming device, voice assistant device, or any other device with which a user might interact. For example, a computing device 209 can represent a set-top box or a streaming device that streams video or music to the user's home and that can monitor the user's viewing or listening habits. A computing device 209 can also represent a voice assistant device to which a user can provide verbal commands or verbal queries for information, purchasing products from the network site, or other actions.

The IOT sensor 203 or computing device 209 can also generate recommendations or predictions for products that are available via a network site, such as an electronic commerce site, that a user associated with IOT sensor 203 or computing device 209 might be interested in purchasing. The sensor network 102 can generate these predictions or recommendations based upon the detected behaviors of a user or conditions detected at a user premises associated with the sensor network 102, such as the user's home or office. For example, a user might be interested in purchasing additional milk when a smart refrigerator detects spoliation or expiration of milk stored therein. Accordingly, the smart refrigerator can generate a prediction that the user will soon purchase a particular brand and/or variety of milk. As another example, a reader or smartphone reading application can generate a prediction that a user will soon rent or purchase a movie sequel when he or she has finished or is close to finishing a previous volume of a movie series.

As yet another example, a temperature sensor, or a computing device of home sensor hub within a user premises, can generate a prediction that a user might soon purchase winter clothes once the temperature within or outside of the home drops to a threshold temperature. A smart scale might generate a prediction that a user will soon purchase new clothes after he or she has lost a threshold amount of weight. In other words, the sensor network 102 can generate various predictions for various types of products or items based upon user activity, behavior, or environmental conditions.

When a sensor or device within the sensor network 102 generates a prediction that a user might wish to purchase or otherwise acquire a product, the respective sensor or device can also generate an inventory pull signal 215 that identifies the product. The inventory pull signal 215 emanating from the sensor network 102 represents a prediction that the user associated with the sensor network 102 might purchase the product in the near future. The inventory pull signal 215 can be sent to the inventory network 205, or certain nodes within the inventory network 205, which can shift inventory of products or items within the inventory network 205 based upon the inventory pull signal 215. Inventory can be shifted within the inventory network 205 to situate items as close to the user premises as possible so that if and when the user purchases a particular item, delivery of the item can be optimized for speed and efficiency. In some cases, inventory can be shifted to and stocked in retail establishments at which the user can purchase and retrieve the item at his or her convenience. In this way, by shifting inventory within the inventory network to inventory nodes that are closest to the user premises according to this "pull" model, users can receive items they order more quickly relative to a traditional "push" model in which items, once they are ordered, are shipped from a warehouse or distribution center and through shipping carriers.

The inventory network 205 comprises a collection of inventory nodes 221 that are in communication with one another. The inventory nodes 221 can be geographically dispersed. The inventory network 205 can represent a collection of inventory nodes 221 that are operated independently of one another or by a single entity that operates a larger inventory network in which inventory is housed and shifted. The inventory nodes 221 can comprise one or more computing devices that are associated with or integrated within manufacturing centers in which products are manufactured, distribution centers, warehouses, shipping carriers, last-mile carriers, ride-sharing participants, freight carriers, autonomous delivery vehicles such as unmanned aerial vehicles, autonomous cars, or other vehicles that are autonomously driven, or brick-and-mortar retail establishments. An inventory node 221 can also include an individual's home, vehicle, or other property, as an individual can participate in the inventory network as an inventory node. Inventory nodes 221 can store or access information about their respective inventory. For example, an inventory node 221 can store information about which products are housed within the location associated with the node.

An inventory node 221 can also execute a broker 223 that can process transactions with other inventory nodes 221 to move inventory within the inventory network 205. The broker 223 can generate inventory pull signals 215 that are exchanged between inventory nodes 221 that result in the shifting of inventory within the inventory network 205. The broker 223 can determine whether to generate an inventory pull signal 215 that is transmitted to other inventory nodes 221, such as downstream inventory nodes, based upon an inventory pull signal 215 received from an upstream inventory node or a sensor network 102. The broker 223 can also initiate shipment of an item within the inventory of an inventory node 221 to a user premises in response to an order placed by the user through a network site, such as an e-commerce platform.

As shown in FIG. 2, the inventory nodes 221 within the inventory network 205 can exchange inventory pull signals 215 between one another in response to an inventory pull signal 215 that is received from a sensor network 102. It should be appreciated that the inventory network 205 can be in communication with many sensor networks 102 that correspond to many user locations or many user accounts.

Next, operation of the sensor network 102 and the inventory nodes 221 within the inventory network 205 are described. First, as noted above, the sensor network 102 can generate inventory pull signals 215 that identify an item or product in response to activity detected by respective IOT sensors 203 or computing devices 209 within the sensor network 102. In one embodiment, the sensor network 102 can transmit an inventory pull signal 215 identifying a product or item that a user associated with the sensor network 102 is predicted to purchase in the near future. The inventory pull signal 215 can be sent to a subset of the inventory nodes 221 within the inventory network 205 that are within a distance threshold of a user premises associated with the sensor network 102 or a user account of the user.

In response to receiving an inventory pull signal 215 from the sensor network 102, the inventory nodes 221 within the inventory network 205 can determine whether the item is within their respective inventories. If the item is not within their respective inventories, the broker 223 can determine whether to generate an inventory pull signal 215 that it sent to downstream inventory nodes 221 within the inventory network 205. The broker 223 can determine whether to generate another inventory pull signal 215 that is sent to downstream inventory nodes 221 based upon rules defined for the inventory node 221 that specify whether the item is one that the inventory node 221 is capable of, allowed to and/or willing to stock. In this sense, downstream inventory nodes 221 are those nodes that are within a threshold distance from the inventory node 221 but further away from the user premises. An inventory pull signal 215 sent to downstream inventory nodes 221 can also include a bid price and/or a bid quantity of the item. In this sense, the downstream inventory node 221 sends an offer to acquire the item from further downstream inventory nodes 221 at the bid price and/or quantity.

In response to receiving an inventory pull signal 215 from an upstream inventory node 221, an inventory node 221 can perform a similar analysis. The inventory nodes 221 within the inventory network 205 can determine whether the item is within their respective inventories. If the item is not within their respective inventories, the broker 223 can determine whether to generate an inventory pull signal 215 that is sent to downstream inventory nodes 221 within the inventory network 205. If the item is within their respective inventories, the broker 223 can determine whether the bid price is sufficient to meet profitability metrics or profit margin defined by rules governing the inventory node 221. The broker 223 can initiate a transaction with the broker 223 of the node sending the inventory pull signal 215 and then initiate retrieval of the requested quantity of the item by the requesting node. In some instances, the requesting node may obtain the various lots of the bid quantity of the item from more than one inventory node 221 within the inventory network 205.

If the item is not within the inventory of a downstream inventory node 221, the broker 223 can determine whether to generate another inventory pull signal 215 that is sent to further downstream inventory nodes 221 based upon rules defined for the inventory node 221 that specify whether the item is one that the inventory node 221 is capable of, allowed to and/or willing to stock. In this sense, further downstream inventory nodes 221 are those nodes that are within a threshold distance from the inventory node 221 but further away from the user premises than the inventory node 221 sending the inventory pull signal 215. Accordingly, the distributed nature of a system according to embodiments of the disclosure results in inventory within an inventory network 205 being shifted to various nodes based upon predicted user demand for items within the inventory network 205 and stocked in locations that are closer to the user premises, which can result in faster delivery of items for end users who are associated with sensor networks 102.

Figure 3:
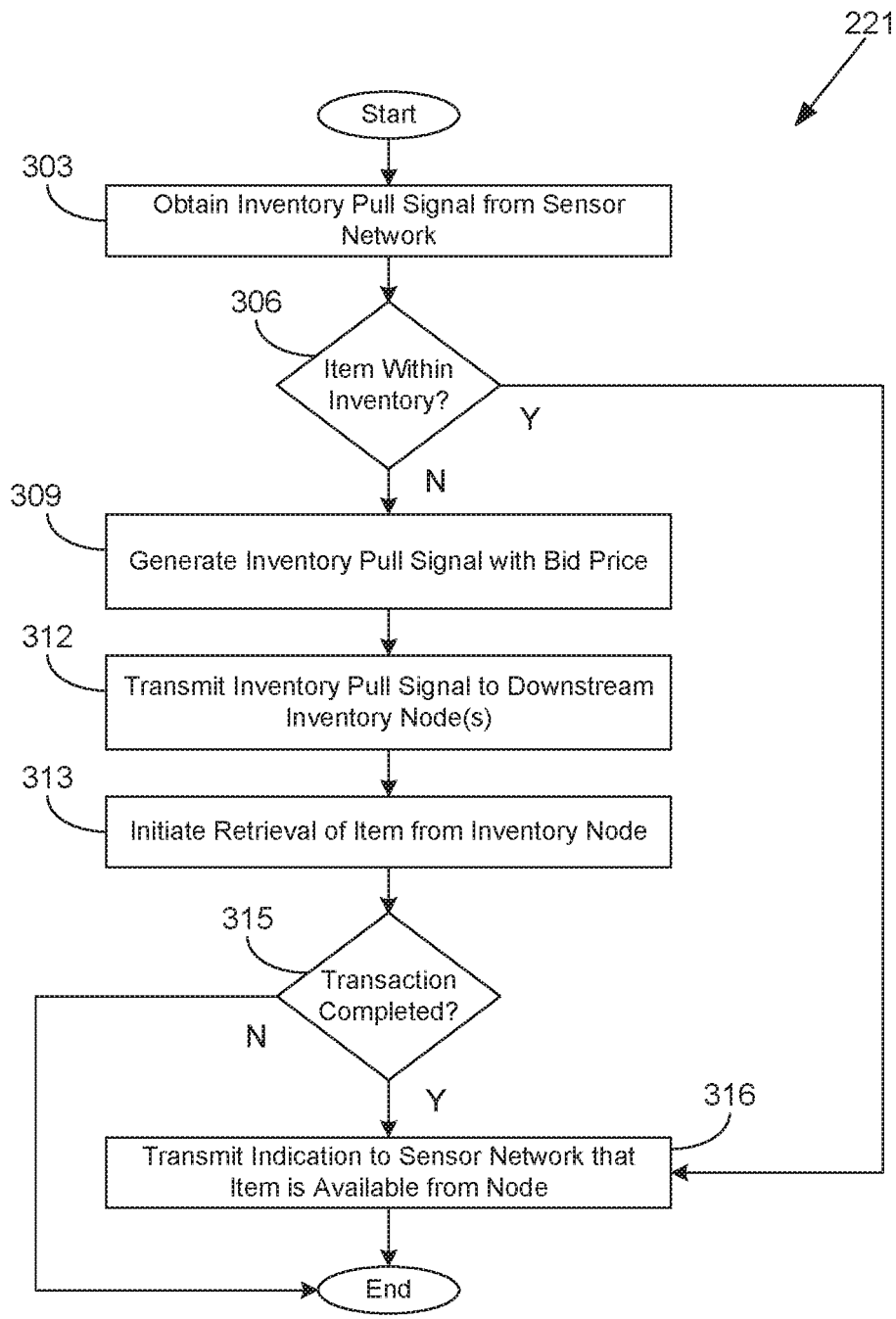
FIGS. 3-4 are flowcharts illustrating examples of functionality implemented by an inventory node according to various embodiments of the present disclosure.

Referring next to FIG. 3, shown is a flowchart that provides one example of the operation of a portion of an inventory node 221 according to various embodiments. It is understood that the flowchart of FIG. 3 provides merely an example of the many different types of functional arrangements that may be employed to implement the operation of the portion of the inventory node 221 as described herein. As an alternative, the flowchart of FIG. 3 can be viewed as depicting an example of elements of a method implemented in an inventory node 221 according to one or more embodiments. FIG. 3 illustrates an example of how the inventory node 221 handles an inventory pull signal 215 received from the sensor network 102 according to one example.

Beginning with box 303, the inventory node 221 can obtain an inventory pull signal 215 from the sensor network 102. As noted above, the sensor network 102 can be configured to send an inventory pull signal 215 to inventory nodes 221 that are within a distance threshold of the sensor network 102 or of a user premises associated with the sensor network 102. Next, at box 306, the inventory node 221 can determine whether the item identified in the inventory pull signal 215 is within the inventory of the inventory node 221. If so, the process can proceed to completion, as the inventory is close to the user premises. Otherwise, the process can proceed to box 309.

At box 309, the inventory node 221 can generate an inventory pull signal 215 with a bid price for downstream inventory nodes 221. Downstream inventory nodes 221 may stock the item and may have the ability to initiate retrieval of the item by the inventory node 221. At box 312, the inventory node 221 can transmit the inventory pull signal 215 to downstream inventory nodes 221. In one embodiment, the inventory pull signal 215 can be broadcast to all downstream inventory nodes 221. In another example, the inventory pull signal 215 can be sent only to those inventory nodes 221 that are within a threshold distance of the inventory node 221 but that are further from a user premises than the inventory node 221.

At box 313, the inventory node 221 can initiate retrieval of the item from a downstream inventory node 221. In other words, the inventory node can determine whether an indication has been received that a downstream inventory node can fulfill some or all of the requested items and initiate retrieval of the items. At box 315, the inventory node 221 can determine whether a transaction with a downstream node has been completed and the requested item is now in the inventory of the inventory node 221.

If a transaction has been completed, the process can proceed to box 316, where the inventory node 221 transmits an indication to the sensor network 102 that the item is now in the inventory of the inventory node 221. If a transaction has not been completed and the requested item has not been retrieved by the inventory node 221, the process can proceed to completion.

Figure 4:
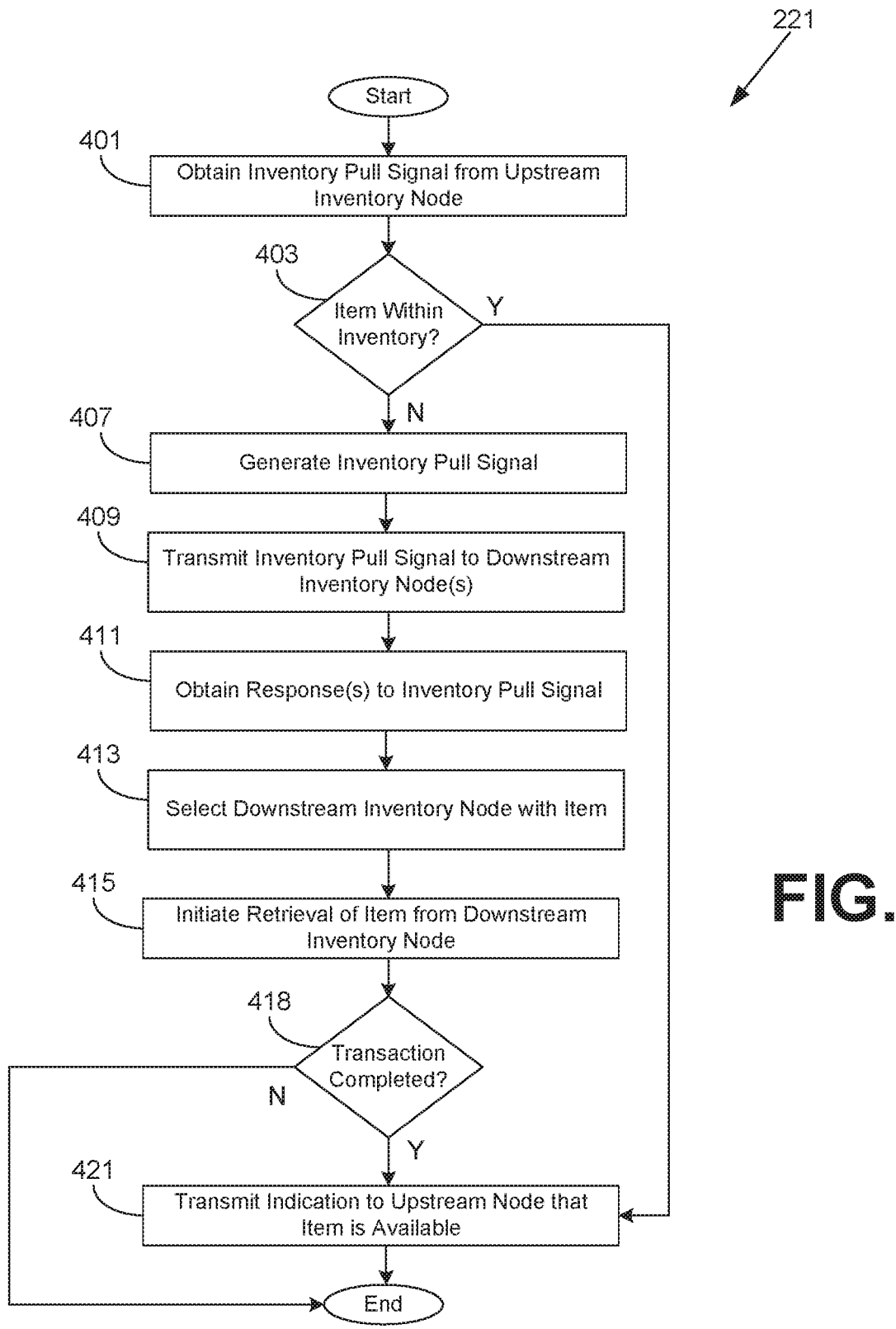

Referring next to FIG. 4, shown is a flowchart that provides one example of the operation of a portion of an inventory node 221 according to various embodiments. It is understood that the flowchart of FIG. 4 provides merely an example of the many different types of functional arrangements that may be employed to implement the operation of the portion of the inventory node 221 as described herein. As an alternative, the flowchart of FIG. 4 can be viewed as depicting an example of elements of a method implemented in an inventory node 221 according to one or more embodiments. FIG. 4 illustrates an example of how the inventory node 221 handles an inventory pull signal 215 received from another inventory node 221 according to one example.

Beginning with box 401, the inventory node 221 can obtain an inventory pull signal 215 from an upstream inventory node 221. Next, at box 403, the inventory node 221 can determine whether the item identified in the inventory pull signal 215 is within the inventory of the inventory node 221. If so, the process can proceed to box 421, where the inventory node 221 can transmit an indication to the upstream inventory node 221 that the item is available for retrieval. In one example, the indication to the upstream inventory node 221 can indicate a price and quantity associated with the item. If the item is not available in the inventory of the inventory node 221, the process can proceed to box 407, where the inventory node 221 generates an inventory pull signal that identifies the item. At box 409, the inventory pull signal is transmitted to downstream inventory nodes 221 within the inventory network.

Next, at box 411, the inventory node can obtain a response from one or more of the downstream inventory nodes 221 that indicate a price and/or a quantity of the item that are available in the respective inventory nodes responding to the inventory pull signal. Proceeding to box 413, the inventory node 221 can select one of the downstream inventory nodes 221 from which the item can be retrieved. The selection of a downstream inventory node 221 can be made based upon a price and quantity indicated within the response to the inventory pull signal.

Next, at box 415, the inventory node 221 can initiate retrieval of the item from the selected downstream inventory node 221. At box 418, the inventory node 221 can determine whether a transaction is completed with a downstream inventory 221. In other words, the inventory node 221 can determine whether the item was successfully retrieved from the downstream inventory node 221. If a transaction was not completed with the downstream inventory node 221, the process can proceed to completion. If a transaction was completed and the item was retrieved from the downstream inventory node 221, at box 421, the inventory node 221 can transmit an indication to the upstream inventory node 221 that the item is now available in the inventory of the inventory node 221. In one embodiment, the indication can identify a price and quantity of the item that are available to the upstream inventory node 221. Thereafter, the process proceeds to completion.

The flowcharts of FIGS. 3-4 show an example of the functionality and operation herein that can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3-4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The inventory node 221 or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The broker 223, inventory node 221, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

The invention claimed is:

1. A method, comprising:
 receiving associations of a plurality of sensors in a sensor network with a user account of a user, wherein at least one of the plurality of sensors in the sensor network is configured to generate an inventory pull signal related to an item in response to activity detected by the at least one sensor, wherein the activity comprises at least one of: media consumption activity associated with the user account, an inventory level of a respective item associated with the user account, or a status of the respective item associated with the user account;
 receiving, by at least one node in an inventory network, the inventory pull signal from the at least one sensor, the at least one node in the inventory network being in proximity to a user premises associated with the user account, wherein the node comprises a broker configured to process a transaction with at least one other node, wherein the at least one other node comprises at least one computing device that is associated with or integrated within at least one of: a manufacturer of products, a warehouse or distribution center, a retail establishment, an intermediary carrier, a last-mile carrier, a taxi or ride-sharing provider, or an autonomous delivery vehicle, the at least one other node comprising a downstream node, the at least one computing device executing another broker;
 wherein the at least one node in the inventory network is configured to:
  determine a distance to the user premises associated with the user account;
  determine whether the item is present within the at least one node;
  generate a respective inventory pull signal for the item in response to determining that the item is not present in an inventory of the at least one node, wherein the respective inventory pull signal comprises a request to transfer the item within the inventory network in response to the distance to the user premises meeting a distance threshold and a prediction that the inventory pull signal will result in a transaction for the item;
  initiate, by the broker, the transaction with the other broker executed by the at least one computing device, the transaction comprising retrieval of the item from the downstream node in response to the other broker determining whether to generate another respective inventory pull signal based upon determining whether the item is available within the at least other one node; and
  transmit an indication to the sensor network that the item is available in the inventory of the at least one node in response to the item being available within the downstream node and retrieval of the item from the downstream node.

2. The method of claim 1, wherein the respective inventory pull signal for the item comprises at least one of a bid price or a bid quantity.

3. The method of claim 1, wherein the respective inventory pull signal is transmitted by the at least one node to a plurality of inventory nodes within the inventory network that are downstream from the user premises in the inventory network.

4. The method of claim 3, wherein the plurality of inventory nodes within the inventory network that are downstream from the user premises in the inventory network are further in distance from the user premises than the at least one node.

5. The method of claim 3, wherein the at least one node is configured to receive an order for the item from the at least one sensor, and the method further comprises:
 initiating delivery of the item from the at least one node to the user premises.

6. The method of claim 1, wherein the at least one node comprises a respective plurality of inventory nodes within the inventory network and the item is transferred to one of the respective plurality of inventory nodes based upon the inventory pull signal.

7. A method for shifting inventory in an inventory network, comprising:
 obtaining a first inventory pull signal at an inventory node in the inventory network from a sensor network associated with a user premises, the inventory node being one of a plurality of inventory nodes and the first inventory pull signal identifying an item available in the inventory network, wherein the inventory node is within a threshold distance from the user premises, wherein the inventory node comprises a broker configured to process a transaction with at least one other inventory node, wherein the at least one other inventory node comprises at least one computing device that is associated with or integrated within at least one of: a manufacturer of products, a warehouse or distribution center, a retail establishment, an intermediary carrier, a last-mile carrier, a taxi or ride-sharing provider, or an autonomous delivery vehicle, the at least one computing device executing another broker;

determining whether the inventory node has the item in an inventory of the inventory node;

identifying a subset of the inventory nodes that are downstream from the inventory node in response to determining that the item is not within the inventory of the inventory node;

transmitting a second inventory pull signal to the subset of the inventory nodes, the second inventory pull signal identifying the item and a bid price associated with the item;

obtaining an indication from at least one of the subset of the inventory nodes or a remainder of the plurality of inventory nodes that are downstream from the subset of the inventory nodes that the item is available within the inventory network, wherein the at least one of the subset of the inventory nodes or at least one of the remainder of the plurality of inventory nodes that are downstream from the subset of the inventory nodes comprises the other broker, wherein the indication is obtained in response to the other broker determining whether to generate a respective inventory pull signal based upon determining whether the item is available; and initiating, by the broker, the transaction with the other broker executed by the at least one computing device, the transaction comprising retrieval of the item from the at least one of the subset of the inventory nodes or the at least one of the remainder of the plurality of inventory nodes to the inventory node.

8. The method of claim 7, further comprising:
obtaining a third inventory pull signal from another of the plurality of nodes in the inventory network; and
initiating retrieval of the item from the inventory node to the other of the plurality of nodes.

9. The method of claim 7, further comprising:
obtaining a request to obtain the item from the inventory node on behalf of a user account associated with the user premises;
process a transaction for the item on behalf of the user account; and
initiate delivery of the item to the user premises.

10. The method of claim 7, further comprising generating the second inventory pull signal based upon at least one rule identifying a profitability metric, wherein the bid price is calculated based upon the profitability metric.

11. The method of claim 7, wherein identifying the subset of the inventory nodes that are downstream from the inventory node further comprises identifying at least one inventory node that is within a threshold distance of the inventory node.

12. The method of claim 7, wherein identifying the subset of the inventory nodes that are downstream from the inventory node further comprises identifying at least one inventory node that is a greater distance from the user premises than the inventory node.

13. The method of claim 7, wherein the sensor network comprises a plurality of sensors configured to detect at least one of user behavior or resource consumption at the user premises.

14. A system, comprising:
a sensor network associated with a user account, wherein the sensor network comprises a plurality of sensors, at least one sensor of the plurality of sensors configured to generate a first inventory pull signal identifying an item;
an inventory network comprising a plurality of geographically dispersed inventory nodes, wherein an inventory node from the plurality of geographically dispersed inventory nodes comprises a broker configured to process a transaction with at least one other inventory node, wherein the at least one other inventory node comprises at least one computing device that is associated with or integrated within at least one of: a manufacturer of products, a warehouse or distribution center, a retail establishment, an intermediary carrier, a last-mile carrier, a taxi or ride-sharing provider, or an autonomous delivery vehicle, the at least one other inventory node comprising a downstream inventory node within the inventory network, the at least one computing device executing another broker, wherein the inventory node is configured to at least:
obtain the first inventory pull signal from the at least one sensor of the sensor network;
determine whether the inventory node is within a threshold distance from a user premises associated with the first inventory pull signal;
determine whether the inventory node has the item in an inventory of the inventory node;
in response to determining that the inventory node lacks the item in the inventory and is within the determined threshold distance, transmit, to the other broker, a second inventory pull signal to the downstream inventory node within the inventory network;
receive, from the other broker an indication that the downstream inventory node has the item in an inventory of the downstream inventory node, wherein the indication is received in response to the other broker determining whether to generate a respective inventory pull signal based upon determining whether the item is available; and
initiate retrieval of the item from the downstream inventory node to the inventory node.

15. The system of claim 14, wherein the first inventory pull signal comprises a prediction that a user associated with the user premises will purchase the item based upon data detected by the at least one sensor of the sensor network.

16. The system of claim 15, wherein the prediction is generated based at least in part upon a media consumption history detected by the at least one sensor or a consumption of a consumable resource detected by the at least one sensor.

17. The system of claim 14, wherein the sensor network comprises a voice assistant device or a media streaming device.

18. The system of claim 14, wherein the inventory node is further configured to obtain a third inventory pull signal from an upstream inventory node within the inventory network.

19. The system of claim 18, wherein the inventory node is further configured to at least initiate retrieval of the item by the upstream inventory node in response to a determination that the third inventory pull signal comprises an acceptable bid price.

20. The system of claim 18, wherein the upstream inventory node is within a distance threshold of another user premises and the upstream inventory node transmitted the third inventory pull signal in response to receiving a fourth inventory pull signal from at least one other sensor of another sensor network associated with the other user premises.

* * * * *